US012137447B2

(12) United States Patent
Yu et al.

(10) Patent No.: US 12,137,447 B2
(45) Date of Patent: Nov. 5, 2024

(54) METHOD OF PERFORMING HYBRID AUTOMATIC REPEAT REQUEST FEEDBACK FOR SEMI-PERSISTENT SCHEDULING TRANSMISSION AND RELATED DEVICE

(71) Applicant: FG Innovation Company Limited, Tuen Mun (HK)

(72) Inventors: Chia-Hao Yu, Taipei (TW); Chien-Chun Cheng, Taipei (TW); Chia-Hung Wei, Taipei (TW); Chie-Ming Chou, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 348 days.

(21) Appl. No.: 17/635,158

(22) PCT Filed: Aug. 14, 2020

(86) PCT No.: PCT/CN2020/109131
§ 371 (c)(1),
(2) Date: Feb. 14, 2022

(87) PCT Pub. No.: WO2021/027917
PCT Pub. Date: Feb. 18, 2021

(65) Prior Publication Data
US 2022/0386329 A1 Dec. 1, 2022

Related U.S. Application Data

(60) Provisional application No. 62/887,470, filed on Aug. 15, 2019.

(51) Int. Cl.
*H04W 72/1263* (2023.01)
*H04L 1/1812* (2023.01)
*H04W 72/23* (2023.01)

(52) U.S. Cl.
CPC ....... *H04W 72/1263* (2013.01); *H04L 1/1812* (2013.01); *H04W 72/23* (2023.01)

(58) Field of Classification Search
CPC .............. H04W 72/1263; H04W 72/23; H04L 1/1812; H04L 1/1854; H04L 1/1864; H04L 1/1822
See application file for complete search history.

(56) References Cited

U.S. PATENT DOCUMENTS

2010/0017671 A1   1/2010   Cai et al.
2010/0182939 A1   7/2010   Ojala et al.
(Continued)

FOREIGN PATENT DOCUMENTS

CN   102160318 A   8/2011
CN   102282796 A   12/2011
(Continued)

OTHER PUBLICATIONS

3GPP TS 38.214, "3rd Generation Partnership Project; Technical Specification Group Radio Access Network; NR; Physical layer procedures for data (Release 15)", V15.5.0 (Mar. 2019).
(Continued)

*Primary Examiner* — Yu-Wen Chang
(74) *Attorney, Agent, or Firm* — ScienBiziP, P.C.

(57) ABSTRACT

A method for a UE for performing a HARQ feedback operation for an SPS transmission is disclosed. The method comprises receiving a transmission configuration for a scheduled transmission, the transmission configuration indicating a first number of HARQ processes used for the scheduled transmission; receiving an SPS transmission configuration for an SPS transmission, the SPS transmission configuration indicating a second number of HARQ processes used for the SPS transmission; receiving scheduling signaling including a reserved HARQ process number for
(Continued)

indicating that a HARQ state feedback operation for the scheduled transmission is disabled; determining a first HARQ process number corresponding to the SPS transmission, the first HARQ process number being selected according to the second number of HARQ processes and being equivalent to the reserved HARQ process number; and transmitting a HARQ state feedback for the SPS transmission with a second HARQ process number derived according to the first HARQ process number.

12 Claims, 2 Drawing Sheets

(56) References Cited

U.S. PATENT DOCUMENTS

| | | | |
|---|---|---|---|
| 2014/0362832 | A1 | 12/2014 | Rudolf et al. |
| 2015/0098371 | A1 | 4/2015 | Vajapeyam et al. |
| 2020/0214084 | A1* | 7/2020 | Panteleev ............. H04W 76/27 |
| 2021/0029679 | A1* | 1/2021 | Si .......................... H04L 1/1685 |

FOREIGN PATENT DOCUMENTS

| | | |
|---|---|---|
| CN | 104254995 A | 12/2014 |
| CN | 105594150 A | 5/2016 |
| CN | 108633070 A | 10/2018 |
| WO | 2014/185836 A1 | 11/2014 |
| WO | WO-2018174680 A1 * | 9/2018 ........... H04L 1/1819 |
| WO | WO-2018211364 A1 * | 11/2018 ........... H04L 1/1819 |
| WO | 2019/005920 A1 | 1/2019 |

OTHER PUBLICATIONS

3GPP TS 38.213, "3rd Generation Partnership Project; Technical Specification Group Radio Access Network; NR; Physical layer procedures for control (Release 15)", V15.5.0 (Mar. 2019).

3GPP TS 38.300, "3rd Generation Partnership Project; Technical Specification Group Radio Access Network; NR; NR and NG-RAN Overall Description; Stage 2 (Release 15)", V15.5.0 (Mar. 2019).

3GPP TS 38.321, "3rd Generation Partnership Project; Technical Specification Group Radio Access Network; NR; Medium Access Control (MAC) protocol specification (Release 15)", V15.5.0 (Mar. 2019).

3GPP TS 38.211, "3rd Generation Partnership Project; Technical Specification Group Radio Access Network; NR; Physical channels and modulation (Release 15)", V15.5.0 (Mar. 2019).

3GPP TS 38.331, "3rd Generation Partnership Project; Technical Specification Group Radio Access Network; NR; Radio Resource Control (RRC) protocol specification (Release 15)", V15.5.0 (Mar. 2019).

Ericsson, "RAN1 decisions for WI Ultra Reliable Low Latency Communication for LTE (LTE_HRLLC)—per topic", R1-1807583, 3GPP TSG RAN WG1 Meeting #93, Busan, South Korea, May 21-25, 2018.

* cited by examiner

METHOD OF PERFORMING HYBRID AUTOMATIC REPEAT REQUEST FEEDBACK FOR SEMI-PERSISTENT SCHEDULING TRANSMISSION AND RELATED DEVICE

CROSS-REFERENCE TO RELATED APPLICATION(S)

The present disclosure is the National Stage of International Patent Application No. PCT/CN2020/109131, filed on Aug. 14, 2020, entitled "METHOD OF PERFORMING HYBRID AUTOMATIC REPEAT REQUEST FEEDBACK FOR SEMI-PERSISTENT SCHEDULING TRANSMISSION AND RELATED DEVICE," which claims the benefit of and priority to U.S. Provisional Patent Application Ser. No. 62/887,470, filed on Aug. 15, 2019, entitled "Methods for Enabling Dynamic Indication on HARQ-less Operation for New Radio Systems", the contents of all of which are hereby incorporated fully by reference into the present disclosure.

FIELD

The present disclosure generally relates to wireless communications, and more particularly, to a method of performing hybrid automatic repeat request (HARQ) feedback for a semi-persistent scheduling (SPS) transmission and a related device.

BACKGROUND

Non-terrestrial networks (NTN) refer to networks, or segments of networks, using an airborne or spaceborne vehicle for transmission, and were studied in the 3GPP RAN Working Group (WG) since the Rel-16 timeline. Spaceborne vehicles are referred to as satellites, including Low Earth Orbiting (LEO) satellites, Medium Earth Orbiting (MEO) satellites, and Geostationary Earth Orbiting (GEO) satellites, as well as Highly Elliptical Orbiting (HEO) satellites.

According to the 3GPP Rel-16 NTN Study Item scope, evaluative works may focus on the service link (e.g., radio link between a satellite and a user equipment (UE)) design, aiming for identifying potential impacts and required enhancements on a design baseline of the terrestrial network (TN).

A HARQ operation is one of the identified impacts of TN. For efficiency, a Stop-and-Wait (SAW) HARQ procedure is introduced where a set of HARQ processes can be run in parallel. The SAW HARQ operation becomes challenging when round trip time (RTT) becomes long since the required number of parallel HARQ processes increases linearly in order to keep physical resource occupation time higher from a UE perspective.

For services with latency requirements, the cost of HARQ retransmission(s) may be prohibitively high if the RTT delay is long. For example, the UE operating in an access network of the GEO satellite may experience a one-way propagation time up to 270 milliseconds (ms). With an access network of an LEO satellite with a 600 kilometer (km) orbit, the one-way propagation delay may change continuously (e.g., between 2 ms and 7 ms). The slow reaction time is expected to have an impact on a retransmission based on a HARQ state feedback (e.g., an extra RTT delay is experienced). Thus, for latency-sensitive applications/services, a mechanism to disable the HARQ operation (called HARQ-less operation) is provided.

A HARQ-less operation may be dynamically configured according to a transmission. One HARQ state feedback opportunity in an uplink (UL) may need to cover both HARQ-less transmission(s) and regular HARQ transmission(s). A HARQ-less operation may exist for dynamic scheduling and SPS scheduling. To control the HARQ operation semi-statically, a radio resource control (RRC) signaling may be used where a UE is configured to perform the HARQ-less operation. In general, a HARQ-less operation may include feedback-less (no HARQ state feedback), ACK-only (no NACK feedback), and NACK-only (no ACK feedback) operations.

During HARQ-less operation, a retransmission decision for a transport block (TB) is not based on a HARQ state feedback from an intended receiver, where the HARQ state feedback is usually determined according to a decoding result of the TB. It is noted that for a HARQ-less operation, it is still possible to have blind retransmission(s) where a retransmission of a TB is blindly performed (e.g., not based on a HARQ state feedback of a previous transmission corresponding to the TB). A HARQ-less operation may be configured in a per UE manner, in a per serving-cell (e.g., Component Carrier (CC)) manner, in a per configured grant manner, in a per Semi-Persistent Scheduling (SPS) manner, in a per BandWidth Part (BWP) manner or in a per cell group manner. When the HARQ-less operation is configured traffic from data radio bearers (DRBs) may not be retransmitted based on a HARQ state feedback.

A HARQ-less operation may be configured for SPS transmission(s). With an SPS transmission, periodic physical resources are provided to a configured UE in a certain time duration. SPS transmission(s) may be activated via a physical layer signaling (e.g., downlink control information (DCI)/physical downlink control channel (PDCCH)). If one SPS transmission is activated via a physical layer signaling, some transmission parameters may be transmitted together with the activation signaling, and the transmission parameters are applicable before releasing the SPS transmission. For SPS transmission(s), the HARQ-less operation may be configured via the RRC, or may dynamically be indicated in an SPS activation phase. In the SPS transmission(s), a HARQ process number used for the HARQ state feedback may not be fixed.

For the UL direction, a configured grant (CG) based transmission may be performed with the HARQ-less operation. With a CG-based transmission, periodic physical resources are provided to a configured UE in a certain time duration for UL traffic delivery. A CG-based transmission may be activated via a physical layer signaling (e.g., DCI/PDCCH) or simply based on an RRC configuration. If one CG-based transmission is activated via physical layer signaling, some transmission parameters may be signaled together with the activation signaling and the transmission parameters are applicable before releasing the CG-based transmission. For CG-based transmission(s), a HARQ-less operation may be configured via the RRC, or may dynamically be indicated in a CG activation phase. In the CG-based transmission(s), the used HARQ process number may not be fixed.

To control a HARQ operation dynamically, physical layer signaling (e.g., DCI/PDCCH) may be used where a UE is indicated to perform the HARQ-less operation in a physical transmission. When a HARQ-less operation is indicated via DCI/PDCCH, certain HARQ process number(s) may be reserved to indicate the HARQ-less operation for a transmission. Alternatively, a dedicated DCI field may be used to indicate the HARQ-less operation of a transmission. In another example, a dedicated DCI field may be used to indicate the HARQ-less operation for a UE, a serving cell of a UE, a BWP of a serving cell of a UE, or a CG/SPS transmission configuration, rather than a physical transmission.

If a HARQ-less operation is indicated by reserving one or more HARQ process numbers in a DCI field, a HARQ state feedback may not be needed for a corresponding transmission. However, a selection of HARQ process number(s) for performing the SPS transmission and CG transmission with the HARQ operation may be affected by the reserved HARQ process number(s).

SUMMARY

The present disclosure provides a method of performing HARQ feedback for an SPS transmission and a related device.

According to an aspect of the present disclosure, a method for a user equipment (UE) for performing a hybrid automatic repeat request (HARQ) feedback operation for a semi-persistent scheduling (SPS) transmission is provided. The method comprises receiving, from a network, a transmission configuration for a scheduled transmission, the transmission configuration indicating a first number of HARQ processes used for the scheduled transmission; receiving, from the network, an SPS transmission configuration for an SPS transmission, the SPS transmission configuration indicating a second number of HARQ processes used for the SPS transmission; receiving, from the network, scheduling signaling including a reserved HARQ process number for indicating that a HARQ state feedback operation for the scheduled transmission is disabled; determining a first HARQ process number corresponding to the SPS transmission, the first HARQ process number being selected according to the second number of HARQ processes, the first HARQ process number being equivalent to the reserved HARQ process number; and transmitting, to the network, a HARQ state feedback for the SPS transmission with a second HARQ process number derived according to the first HARQ process number.

According to another aspect of the present disclosure, a method for a user equipment (UE) for performing a hybrid automatic repeat request (HARQ) feedback operation for a semi-persistent scheduling (SPS) transmission is provided. The method comprises receiving, from a network, a transmission configuration for a scheduled transmission, the transmission configuration indicating a first number of HARQ processes used for the scheduled transmission; receiving, from the network, an SPS transmission configuration for an SPS transmission, the SPS transmission configuration indicating a second number of HARQ processes used for the SPS transmission; receiving, from the network, scheduling signaling including a reserved HARQ process number for indicating that a HARQ state feedback operation for the scheduled transmission is disabled; determining a first HARQ process number corresponding to the SPS transmission, the first HARQ process number being selected according to the second number of HARQ processes, the first HARQ process number being equivalent to the reserved HARQ process number; and transmitting, to the network, a HARQ state feedback for the SPS transmission with the first HARQ process number, wherein the reserved HARQ process number indicates the HARQ state feedback until a new data indicator (NDI) corresponding to the first HARQ process number is determined to be toggled.

According to another aspect of the present disclosure, a method for a user equipment (UE) for performing a hybrid automatic repeat request (HARQ) feedback operation for a semi-persistent scheduling (SPS) transmission is provided. The method comprises receiving, from a network, a transmission configuration for a scheduled transmission, the transmission configuration indicating a first number of HARQ processes used for the scheduled transmission; receiving, from the network, an SPS transmission configuration for an SPS transmission, the SPS transmission configuration indicating a second number of HARQ processes used for the SPS transmission; receiving, from the network, scheduling signaling including a reserved HARQ process number for indicating that a HARQ state feedback operation for the scheduled transmission is disabled; determining a first HARQ process number corresponding to the SPS transmission, the first HARQ process number being selected according to the second number of HARQ processes, the first HARQ process number being equivalent to the reserved HARQ process number; and disabling a HARQ state feedback operation for the SPS transmission with the first HARQ process number by not transmitting, to the network, a HARQ state feedback.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

Figure 1:
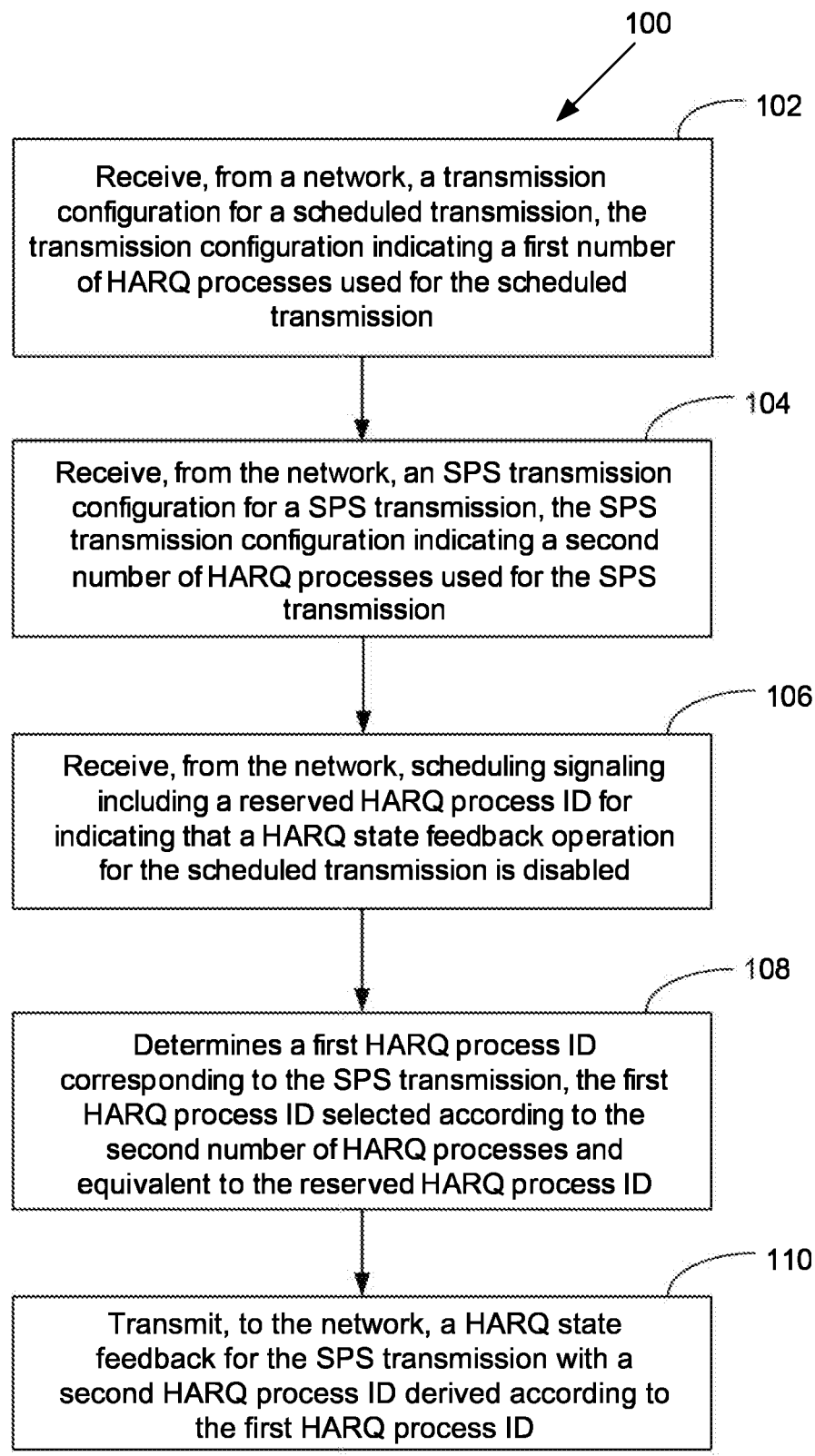
FIG. 1 is a flowchart illustrating a HARQ feedback operation for an SPS transmission, in accordance with example implementations of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "in one embodiment", "in one implementation", "in one alternative" etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of application-specific integrated circuitry (ASIC), programmable logic arrays, and/or using one or more digital signal processor (DSPs). Although some of the disclosed implementations are directed to software installed and executing on computer hardware, alternative implementations as firmware, as hardware or as a combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system) typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (NG) Core (NGC), 5G CN (5GC), or an internet) via a RAN established by the BS.

It should be noted that, in the present disclosure, a UE may include, but is not limited to, a mobile station, a mobile terminal or device, a user communication radio terminal. For example, a UE may be a portable radio equipment that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), a Next Generation (NG)-eNB as in an Evolved Universal Terrestrial Radio Access (E-UTRA) BS in connection with the 5GC, a gNB as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (may often be referred to as a serving cell) provides services to serve one or more UEs within the cell's radio coverage (e.g., each cell schedules the downlink (DL) and optionally UL resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR V2X services. Each cell may have overlapped coverage areas with other cells.

To determine a HARQ process number (or called a HARQ process ID) for a DL SPS transmission, the network (NW) side may provide an RRC parameter, such as "nrofHARQ-Processes," to define a range of HARQ process IDs for an SPS physical downlink shared channel (PDSCH) transmission, as illustrated in Table 1 for an SPS transmission configuration. For example, if "nrofHARQ-Processes" is configured to '4', a HARQ process ID for an SPS PDSCH transmission is selected from a set {0, 1, 2, 3}.

TABLE 1

SPS-Config information element

```
-- ASN1START
-- TAG-SPS-CONFIG-START
SPS-Config ::=          SEQUENCE {
    periodicity            ENUMERATED {ms10, ms20, ms32, ms40, ms64, ms80, ms128,
                         ms160, ms320, ms640, spare6, spare5, spare4, spare3, spare2, spare1},
```

TABLE 1-continued

| | | | |
|---|---|---|---|
| nrofHARQ-Processes | INTEGER (1 ... 8), | | |
| n1PUCCH-AN | PUCCH-ResourceId | OPTIONAL, | -- Need M |
| mcs-Table | ENUMERATED {qam64LowSE} | OPTIONAL, -- Need S | |
| ... | | | |
| } | | | |
| -- TAG-SPS-CONFIG-STOP | | | |
| -- ASN1STOP | | | |

| SPS-Config field descriptions |
|---|
| mcs-Table |
| Indicates the MCS table the UE shall use for DL SPS (see TS 38.214 [19], clause 5.1.3.1. If present, the UE shall use the MCS table of low-SE 64 QAM table indicated in Table 5.1.3.1-3 of TS 38.214 [19]. If this field is absent and field mcs-table in PDSCH-Config is set to 'qam256' and the activating DCI is of format 1_1, the UE applies the 256 QAM table indicated in Table 5.1.3.1-2 of TS 38.214 [19]. Otherwise, the UE applies the non-low-SE 64 QAM table indicated in Table 5.1.3.1-1 of TS 38.214 |
| n1PUCCH-AN |
| HARQ resource for PUCCH for DL SPS. The network configures the resource either as format0 or format1. The actual PUCCH-Resource is configured in PUCCH-Config and referred to by its ID. See TS 38.213 [13], clause 9.2.3. |
| nrofHARQ-Processes |
| Number of configured HARQ processes for SPS DL (see TS 38.321 [3], clause 5.8.1). |
| periodicity |
| Periodicity for DL SPS (see TS 38.214 [19] and TS 38.321 [3], clause 5.8.1). |

Moreover, to determine a HARQ process ID associated with a slot where an SPS PDSCH transmission starts, the following equation (Eq. 1) from the 3GPP TS 38.321 V15.5.0 may be used:

HARQ process ID=[floor(CURRENT_slot×10/(numberOfSlotsPerFrame×periodicity))]modulo nrofHARQ-Processes, (Eq. 1)

where CURRENT_slot=[(SFN×numberOfSlotsPerFrame)+slot number in the frame], numberOfSlotsPerFrame is referred to as the number of consecutive slots of a frame as specified in the 3GPP TS 38.211 V15.5.0, SFN is a system frame number that has a 10-bit value for indexing radio frames as specified in the 3GPP TS 38.331 V15.5.0, periodicity stands for a periodicity of an SPS PDSCH transmission as exemplified in Table 1, the floor(x) operation takes the largest integer that is smaller than x, and modulo stands for a modulo operation.

For a HARQ process ID of a dynamic PDSCH transmission scheduled by DCI, a total number of HARQ processes, "nrofHARQ-ProcessesForPDSCH", for a serving cell may be configured by RRC signaling, as illustrated in Table 2 for a dynamic transmission configuration. Since an SPS PDSCH retransmission is dynamically scheduled, a value of "nrofHARQ-ProcessesForPDSCH" may be configured equal to or larger than a value of "nrofHARQ-Processes".

TABLE 2

| | |
|---|---|
| PDSCH-ServingCellConfig ::= | SEQUENCE { |
| codeBlockGroupTransmission | SetupRelease { PDSCH-CodeBlockGroupTransmission } OPTIONAL, -- Need M |
| xOverhead | ENUMERATED { xOh6, xOh12, xOh18 } OPTIONAL, -- Need S |
| nrofHARQ-ProcessesForPDSCH | ENUMERATED {n2, n4, n6, n10, n12, n16} OPTIONAL, -- Need S |
| pucch-Cell | ServCellIndex     OPTIONAL,     -- Cond SCellAddOnly |
| ..., | |
| [[ | |
| maxMIMO-Layers | INTEGER (1 .. 8) OPTIONAL, -- Need M |
| processingType2Enabled | BOOLEAN OPTIONAL -- Need M |
| ]] | |
| } | |

| nrofHARQ-ProcessesForPDSCH |
|---|
| The number of HARQ processes to be used on the PDSCH of a serving cell. Value n2 corresponds to 2 HARQ processes, value n4 to 4 HARQ processes, and so on. If the field is absent, the UE uses 8 HARQ processes (see TS 38.214 [19], clause 5.1). |

Thus, a HARQ process ID derived from Eq. 1, for an SPS PDSCH transmission, may be selected from a set {0, 1, . . . , (nrofHARQ-Processes−1)}. On the other hand, HARQ process ID(s) reserved for an indication of HARQ-less operation may be randomly selected from the set {0, 1, . . . , (nrofHARQ-ProcessesForPDSCH−1)}. If a value (e.g., a HARQ process ID for an SPS PDSCH transmission) selected from a set {0, 1, . . . , (nrofHARQ-Processes−1)} is equivalent to the reserved HARQ process ID, specific UE behavior related to the HARQ state feedback operation may be defined.

Furthermore, to determine a HARQ process M for a UL CG transmission, the NW side provides a "nrofHARQ-processes" to define a range of a HARQ process ID for a CG PUSCH transmission, as illustrated in Table 3 for an SPS transmission configuration. For example, if "nrofHARQ-processes" is configured to '8', a HARQ process ID for a CG PUSCH transmission is selected from a set {0, 1, 2, . . . , 7}.

Processes−1)}. On the other hand, HARQ process ID(s) reserved for an indication of HARQ-less operation may be randomly selected from a set {0, 1, . . . , 15}. If a value (e.g., HARQ process ID of CG PUSCH transmission) selected

TABLE 3

```
ConfiguredGrantConfig ::=        SEQUENCE {
    frequencyHopping               ENUMERATED {intraSlot, interSlot}   OPTIONAL,    -- Need S,
    cg-DMRS-Configuration          DMRS-UplinkConfig,
    mcs-Table                      ENUMERATED {qam256, qam64LowSE}     OPTIONAL,    -- Need S
    mcs-TableTransformPrecoder     ENUMERATED {qam256, qam64LowSE}     OPTIONAL,    -- Need S
    uci-OnPUSCH                    SetupRelease { CG-UCI-OnPUSCH }     OPTIONAL,    -- Need M
    resourceAllocation             ENUMERATED { resourceAllocationType0, resourceAllocationType1,
dynamicSwitch },
    rbg-Size                       ENUMERATED {config2}    OPTIONAL,    -- Need S
    powerControlLoopToUse          ENUMERATED {n0, n1},
    p0-PUSCH-Alpha                 P0-PUSCH-AlphaSetId,
    transformPrecoder              ENUMERATED {enabled, disabled}   OPTIONAL,    -- Need S
    nrofHARQ-Processes             INTEGER(1 . . . 16),
    repK                           ENUMERATED {n1, n2, n4, n8},
    repK-RV                        ENUMERATED {s1-0231, s2-0303, s3-0000}   OPTIONAL,    -- Need R
    periodicity                    ENUMERATED {
        sym2, sym7, sym1x14, sym2x14, sym4x14, sym5x14, sym8x14, sym10x14, sym16x14, sym20x14,
sym32x14, sym40x14, sym64x14, sym80x14, sym128x14, sym160x14, sym256x14, sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12, sym32x12,
sym40x12, sym64x12, sym80x12, sym128x12, sym160x12, sym256x12, sym320x12, sym512x12,
sym640x12, sym1280x12, sym2560x12
    },
    configuredGrantTimer           INTEGER (1 . . . 64)   OPTIONAL,    -- Need R
    rrc-ConfiguredUplinkGrant      SEQUENCE {
        timeDomainOffset               INTEGER (0 . . . 5119),
        timeDomainAllocation           INTEGER (0 . . . 15),
        frequencyDomainAllocation      BIT STRING (SIZE(18)),
        antennaPort                    INTEGER (0 . . . 31),
        dmrs-SeqInitialization         INTEGER (0 . . . 1)   OPTIONAL,    -- Need R
        precodingAndNumberOfLayers     INTEGER (0 . . . 63),
        srs-ResourceIndicator          INTEGER (0 . . . 15)   OPTIONAL,    -- Need R
        mcsAndTBS                      INTEGER (0 . . . 31),
        frequencyHoppingOffset  INTEGER (1 . . . maxNrofPhysicalResourceBlocks-1)  OPTIONAL, -- Need R
        pathlossReferenceIndex         INTEGER (0 . . . maxNrofPUSCH-PathlossReferenceRSs-1),
        . . .                                              OPTIONAL, -- Need R
    }
    . . .
}
```

| nrofHARQ-Processes |
|---|
| The number of HARQ processes configured. It applies for both Type 1 and Type 2. See TS 38.321 [3], clause 5.4.1. |

To determine a HARQ process ID associated with a first symbol where a CG PUSCH transmission starts, the following equation (Eq. 2) from the 3GPP TS 38.321, V15.5.0, may be used:

$$\text{HARQ Process ID} = [\text{floor}(\text{CURRENT\_symbol}/\text{periodicity})] \bmod \text{nrofHARQ-Processes}, \quad (\text{Eq. 2})$$

where CURRENT_symbol=(SFN×numberOfSlotsPerFrame×numberOfSymbolsPerSlot+slot number in the frame×numberOfSymbolsPerSlot+symbol number in the slot), numberOfSlotsPerFrame is referred to as the number of consecutive slots in a frame as specified in the 3GPP TS 38.211 V15.5.0, numberOfSymbolsPerSlot is referred to as the number of consecutive symbols in a slot as specified in the 3GPP TS 38.211 V15.5.0, SFN is a system frame number that is a 10-bit value for indexing radio frames as described in the 3GPP TS 38.331 V15.5.0, the floor(x) operation takes the largest integer that is smaller than x, and modulo stands for a modulo operation.

For a HARQ process ID of a dynamic PUSCH transmission scheduled by DCI, a total number of 16 HARQ processes of a serving cell is supported by a UE. For a CG PUSCH transmission, a HARQ process ID derived from Eq. 2 may be selected from a set {0, 1, . . . , (nrofHARQ-Processes−1)} is equivalent to the reserved HARQ process ID, specific UE behavior related to the HARQ state feedback operation may be defined.

In a word, the present disclosure is related to a collision between a HARQ process ID of an SPS PDSCH transmission (or CG PUSCH transmission) and the reserved HARQ process ID (e.g., as an indication of HARQ-less operation).

FIG. 1 illustrates a method 100 for a UE to perform a HARQ feedback operation for an SPS transmission. The method 100 may be applied for performing HARQ feedback for a CG PUSCH transmission. In action 102, the UE receives, from a network (e.g., a BS), a transmission configuration for a scheduled transmission, the transmission configuration indicating a first number of HARQ processes (e.g., 16 HARQ processes) used for the scheduled transmission. In action 104, the UE receives, from the network, an SPS transmission configuration for an SPS transmission, the SPS transmission configuration indicating a second number of HARQ processes (e.g., 8 HARQ processes) used for the SPS transmission. In action 106, the UE receives, from the network, a scheduling signaling including a reserved HARQ process ID (e.g., 4) for indicating a HARQ state feedback operation for the scheduled transmission being disabled. In action 108, the UE determines a first HARQ process ID corresponding to the SPS transmission, the first HARQ process ID (e.g., 4) selected according to the second number of HARQ processes and equivalent to the reserved HARQ process ID (e.g., 4). In action 110, the UE transmits, to the network, a HARQ state feedback for the SPS transmission with a second HARQ process ID (e.g., one of 0-3 and 5-7) derived according to the first HARQ process ID.

On the contrary, if the UE determines that the reserved HARQ process ID does not overlap a range derived based on the second number of HARQ processes, or does not overlap a range derived based on the first number of HARQ processes, the UE may transmit, to the network, the HARQ state feedback for the SPS transmission with the first HARQ process number. In this case, the reserved HARQ process ID may be greater than or equal to any HARQ process ID derived based on the second number of HARQ processes, a maximum HARQ process ID derived based on the first number of HARQ processes may be greater than or equal to any HARQ process ID derived based on the second number of HARQ processes, or the reserved HARQ process number may be greater than or equal to any HARQ process ID derived based on the first number of HARQ processes. In one implementation, the scheduled transmission includes a PDSCH transmission or a PUSCH transmission.

In one implementation, the scheduling signaling may be DCI.

In one implementation, the first HARQ process ID may be selected according to Eq. 1 or Eq. 2, as mentioned above. More specifically, the first HARQ process ID may be selected from a set $\{0, 1, \ldots, (\text{nrofHARQ-Processes}-1)\}$.

In one implementation, the second HARQ process ID is derived by shifting the first HARQ process ID with an offset value. The offset value may be configured by the network via the RRC message or DCI.

For example, when a selected HARQ process ID (e.g., selected from a set $\{0, 1, \ldots, (\text{nrofHARQ-Processes}-1)\}$) of an SPS transmission, specifically an SPS PDSCH transmission, is equivalent to the reserved HARQ process ID that is used for indicating HARQ-less operation, the UE may transmit a HARQ state feedback (e.g., ACK/NACK) for the SPS transmission with a HARQ process ID different from the selected HARQ process ID. In this case, the UE may determine a HARQ process ID for the SPS transmission by shifting the selected HARQ process ID with an offset value. Thus, the UE may not use a HARQ process ID for the SPS transmission, which is the same with the reserved HARQ process ID, to avoid confusing the network about HARQ-less operation.

In some implementations, the second HARQ process number is obtained by imposing a modulo operation on a shifted version of the first HARQ process number, where the modulo operation is associated with the second number of HARQ processes.

It is noted that a NR DL HARQ process ID range may be shared between a scheduled transmission and an SPS transmission (e.g., SPS PDSCH transmission). For example, a HARQ process ID='y' is used for an SPS transmission. If the same HARQ process ID='y' appears in the DCI with a corresponding New Data Indicator (NDI) field untoggled, a scheduled transmission indicated by the DCI represents a retransmission of the SPS transmission. In this case, the DCI may be scrambled by a Configured Scheduling Radio Network Temporary Identifier (CS-RNTI), a Cell RNTI (C-RNTI), a Modulation Coding Scheme RNTI (MCS-RNTI), or a new Non-Terrestrial Networks Cell RNTI (NTN-C-RNTI).

In some implementations, multiple SPS configurations may be configured and each SPS configuration may correspond to different transmission parameter sets (for example, with different periodicities and/or different "nrofHARQ-Processes"). In addition, SPS transmissions corresponding to different SPS configurations may share a same HARQ process ID range. In one example, an identifier associated with each SPS configuration is applied by the UE to determine a valid HARQ process ID range of the SPS configuration. To determine the valid HARQ process ID range of the SPS configuration, an RRC parameter "nrofHARQ-Processes" corresponding to the SPS configuration may be additionally used. In this case, the valid HARQ process IDs for different SPS configurations may be orthogonal.

It is noted that the HARQ process ID range may be shared among the multiple SPS configurations and the scheduled transmissions.

In a case that a derived HARQ process ID for an SPS transmission is the same as a reserved HARQ ID for indicating HARQ-less operation for a scheduled transmission, methods for a UE to perform a HARQ state feedback operation for the SPS transmission are disclosed.

Method 1: Orthogonal HARQ Process IDs for an SPS Transmission and a Dynamically Scheduled HARQ-Less Transmission.

For dynamic scheduling, HARQ process IDs are orthogonal between a HARQ transmission and a HARQ-less transmission if a set of reserved HARQ process IDs is used for an indication of HARQ-less transmission. Similarly, the UE may perform a HARQ state feedback operation for SPS transmission(s) with an orthogonal set of HARQ process IDs rather than the set of reserved HARQ process IDs for indicating dynamically scheduled HARQ-less transmission. In one example, the UE may choose a HARQ process ID as reserved HARQ process ID(s) from a range that is outside a HARQ process ID range configured for the SPS transmission(s).

In one implementation, the reserved HARQ process ID(s) for indicating dynamically scheduled HARQ-less transmission may not overlap the configured HARQ process ID range for the SPS transmission(s). For example, the reserved HARQ process ID(s) is greater than or equal to "nrofHARQ-Processes", which may be used to derive a HARQ process ID range for the SPS transmission(s).

In one implementation, the reserved HARQ process ID(s) may belong to a HARQ process ID range for dynamically scheduled transmissions. For example, the reserved HARQ process ID(s) is smaller than "nrofHARQ-Processes-ForPDSCH".

In one implementation, the reserved HARQ process ID(s) may not belong to a HARQ process ID range for dynamically scheduled transmissions. For example, the reserved HARQ process ID(s) is equal to or greater than "nrofHARQ-ProcessesForPDSCH". In this case, if a UE receives a HARQ process ID indicated by the DCI format 1_0 that is equal or larger than the configured value provided by a higher layer parameter "nrofHARQ-ProcessesForPDSCH", the UE may determine the received HARQ process ID as the reserved HARQ process ID for HARQ-less operation.

In one implementation, HARQ process ID(s) for SPS transmission is a subset of a HARQ process ID range for dynamically scheduled transmission. In one example, "nrof-HARQ-ProcessesForPDSCH">"nrofHARQ-Processes".

Moreover, a new RRC parameter, "HARQless-ProcessIds", is used for indicating reserved HARQ process ID(s) for HARQ-less operation, for example, a dynamically scheduled PDSCH transmission. It may be mandated that the element(s) in "HARQless-ProcessIds" indicates a value greater than or equal to the number of configured HARQ process IDs (e.g., "nrofHARQ-Processes") for SPS transmission(s). Besides, the number of HARQ process IDs for dynamically scheduled transmission is greater than or equal to the number of HARQ process IDs for SPS transmission(s), specifically "nrofHARQ-ProcessesForPDSCH">"nrofHARQ-Processes".

In some implementations, if a UE is configured both the higher layer parameters "nrofHARQ-Processes" and "nrofHARQ-ProcessesForPDSCH", and a value of "nrofHARQ-Processes" (e.g., implying a HARQ process ID is selected from a set of {0, 1, . . . , (nrofHARQ-Processes−1)} for SPS transmission(s)) is greater than or equal to a value of "nrofHARQ-ProcessesForPDSCH" (e.g., implying a HARQ process ID is selected from a set of {0, 1, . . . , (nrofHARQ-ProcessesForPDSCH-1)} for dynamically scheduled transmissions), the UE may not expect to receive retransmission for a SPS retransmission whose HARQ process IDs are greater than or equal to the value of "nrofHARQ-ProcessesForPDSCH".

Method 2: Modifying Derived HARQ Process ID of an SPS Transmission Whenever Colliding with a Reserved HARQ Process ID for Indicating HARQ-Less Operation.

A HARQ process ID derived by a formula (e.g., Eq. 1, as mentioned above), for an SPS transmission, is modified. For example, when a HARQ process ID collision occurs between an SPS transmission and reserved HARQ process ID(s) for HARQ-less operation, a derived HARQ process ID for the SPS transmission is shifted to another one within the HARQ process ID range by a predetermined rule.

In one implementation, a derived HARQ process ID for an SPS transmission is shifted according to a fixed value 'a' where the shifted HARQ process ID may be within a HARQ process ID range (e.g., a set {0, 1, . . . , (nrofHARQ-Processes−1)}) for the SPS transmission. In one example, for a HARQ process ID='x' for SPS transmission conflicting with a reserved HARQ process ID for HARQ-less operation, the HARQ process ID='x' is shifted by a value to determine a new HARQ process ID as 'y'=(x+a) module nrofHARQ-Processes.

In an example, the fixed value 'a' may be a positive or negative integer. In another example, the fixed value 'a' may be smaller than an integer value. For example, 0<a<nrofHARQ-Processes. In another example, −nrofHARQ-Processes<a<nrofHARQ-Processes. In some examples, the fixed value 'a' is configured by a gNB. In some examples, the fixed value 'a' is defined in the 3GPP specifications.

In one implementation, a derived HARQ process ID for an SPS transmission is shifted for a variable value 'b', where the shifted HARQ process ID may be within a HARQ process ID range (e.g., a set {0, 1, . . . , (nrofHARQ-Processes−1)}) for the SPS transmission. In one example, the value 'b' is configured by a gNB via the RRC or the DCI. In another example, the value 'b' may be a positive or negative integer (e.g., the information bit is 3 bits, where the most significant bit (MSB) indicates a positive or negative value).

In other implementations, if a HARQ process ID for an SPS transmission collides with a reserved HARQ process ID for HARQ-less operation, the HARQ process ID corresponding to the SPS PDSCH reception may be aborted.

Method 3: Prioritizing Either of an SPS Transmission or a HARQ-Less Transmission.

Another way to resolve the HARQ process ID collision is to prioritize one of the SPS transmission and the HARQ-less transmission. More specifically, when a HARQ process ID of an SPS transmission collides with a reserved HARQ process ID that indicates a dynamically scheduled transmission with HARQ-less operation, a UE may determine whether to perform a HARQ state feedback operation for the SPS transmission.

In some implementations, an SPS transmission is prioritized over dynamic HARQ-less transmission. In one example, a HARQ process ID derived for an SPS transmission is the same as the reserved HARQ process ID. The HARQ process ID is used by the SPS transmission with HARQ state feedback. In one example, if the UE receives the dynamically scheduled DCI with the HARQ process ID after the reception of the SPS transmission and if a New Data Indication (NDI) field in the dynamically scheduled DCI is untoggled, a PDSCH scheduled by the dynamically scheduled DCI with the HARQ process ID is determined as an retransmission of the SPS transmission. In one example, if a UE receives a dynamically scheduled DCI with the HARQ process ID after the reception of the SPS transmission and if an NDI field in the dynamically scheduled DCI is toggled, the HARQ process ID is released from the SPS transmission, and a PDSCH scheduled by the dynamically scheduled DCI with the HARQ process ID is determined as a new transmission with HARQ-less operation. Thus, the UE may perform a HARQ state feedback operation for the SPS transmission with the same HARQ process ID as the reserved HARQ process ID.

In some implementations, dynamic HARQ-less transmission may be prioritized over SPS transmission. That is, the UE does not perform HARQ state feedback operation for the SPS transmission with the same HARQ process ID as the reserved HARQ process ID. In this case, there is no retransmission for the SPS transmission. The corresponding HARQ state feedback to the network may be ignored. In some implementations, the corresponding HARQ state feedback to the network may be mandated as an "ACK" state. In some implementations, irrespective of the HARQ state feedback, the network determines the HARQ state feedback as "ACK", and retransmission is not scheduled or performed.

In some implementations, the prioritization between an SPS transmission and a dynamic HARQ-less transmission is determined by the UE according to an ARQ operation (e.g., Radio Link Control (RLC) Acknowledged Mode (AM) or Transparent Mode (TM) or Unacknowledged Mode (UM)). For example, if an RLC AM is applied by the UE, the UE may determine that the HARQ-less transmission has higher priority than the SPS transmission, and thus may not perform HARQ state feedback operation for the SPS transmission. Alternatively, if an RLC TM is applied by the UE, the UE may determine that the SPS transmission is prioritized, and thus may perform a HARQ state feedback operation for the SPS transmission with the same HARQ process ID as the reserved HARQ process ID.

It is noted that an NR UL HARQ process ID range may be shared between a dynamically scheduled transmission and a CG transmission (e.g., CG PUSCH transmission). For example, a HARQ process ID='y' is used for CG transmission. If the same HARQ process ID 'y' appears in the DCI with a corresponding NDI field untoggled, a dynamically scheduled transmission indicated by the DCI represents a retransmission of the CG transmission. The dynamically scheduled transmission may be scrambled by a C-RNTI, among others, and the CG transmission is scrambled by a CS-RNTI.

Multiple CG configurations or CG configuration groups may be configured and each of the CG configurations may correspond to different transmission parameter sets (e.g., different periodicity and/or different "nrofHARQ-Processes"). In addition, CG transmissions corresponding to different CG configurations may share a same HARQ process ID range. In one example, an identifier associated with each CG configuration or a CG configuration group and corresponding "nrofHARQ-Processes" are applied by the UE to determine a valid HARQ process ID range of the CG configuration. In this case, the valid HARQ process IDs for different CG configurations or CG configuration groups may be orthogonal; that is, their respective valid HARQ process ID ranges may not overlap.

It is noted that the HARQ process ID range may be shared among the multiple CG configurations and the dynamically scheduled transmissions.

In a case that a CG transmission and a dynamically scheduled transmission with HARQ-less operation share the same HARQ process ID, methods for a UE to perform a HARQ state feedback operation for the CG transmission are disclosed.

Method 1: Orthogonal HARQ Process IDs for a CG Transmission and a Dynamically Scheduled HARQ-Less Transmission.

For dynamic scheduling, HARQ process IDs are orthogonal between a HARQ transmission and a HARQ-less transmission if a set of reserved HARQ process IDs is used for an indication of HARQ-less transmission. Similarly, the UE may perform a HARQ state feedback operation for CG transmission(s) with an orthogonal set of HARQ process IDs rather than the set of reserved HARQ process IDs for indicating dynamically scheduled HARQ-less transmission. In one example, the UE may choose a HARQ process ID as reserved HARQ process ID(s) from a range that is outside a HARQ process ID range configured for the CG transmission(s).

In one implementation, the reserved HARQ process ID(s) for indicating dynamically scheduled HARQ-less transmission may not overlap the configured HARQ process ID range for the CG transmission(s). For example, the reserved HARQ process ID(s) is larger or equal to "nrofHARQ-Processes" for CG transmission.

In one implementation, the reserved HARQ process ID(s) may belong to a HARQ process ID range for dynamically scheduled transmissions. For example, the reserved HARQ Process ID(s) is less than a number of UL HARQ process IDs in a serving cell for a UE. The number in one example is '16'.

Moreover, a new RRC parameter, "HARQless-ProcessIds" is used for indicating reserved HARQ process ID(s) for HARQ-less operation, for example, a dynamically scheduled PUSCH transmission. It may be mandated that the element(s) in "HARQless-ProcessIds" indicates a value greater than or equal to the number of configured HARQ process IDs (e.g., "nrofHARQ-Processes") for CG transmission(s).

Method 2: Modifying Derived HARQ Process ID of a CG Transmission Whenever Colliding with a Reserved HARQ Process ID for Indicating HARQ-Less Operation.

A HARQ process ID derived by a formula (e.g., Eq. 2, as mentioned above), for a CG transmission, is modified. For example, when a HARQ process ID collision between a CG transmission and a dynamically scheduled transmission with HARQ-less operation occurs, a derived HARQ process ID for the CG transmission is shifted to another one within the HARQ process ID range by a predetermined rule.

In one implementation, a derived HARQ process ID for a CG transmission is shifted by a fixed value 'a' where the shifted HARQ process ID may be within a HARQ process ID range (e.g., a set $\{0, 1, \ldots, (\text{nrofHARQ-Processes}-1)\}$) for the CG transmission. In one example, for a HARQ process ID 'x' for CG transmission conflicting with a reserved HARQ process ID for HARQ-less operation, the HARQ process ID='x' is shifted by a value to determine a new HARQ process ID as 'y'=(x+a) module nrofHARQ-Processes.

In an example, the fixed value 'a' may be a positive or negative integer.

In another example, the fixed value 'a' may be less than an integer value. For example, 0<a<nrofHARQ-Processes. In another example, −nrofHARQ-Processes<a<nrofHARQ-Processes. In some examples, a derived CG HARQ ID for CG transmission is shifted for a variable value 'b', where the shifted HARQ process ID may be within a HARQ process ID range for the CG transmission.

In one example, the value 'b' is configured by gNB via the RRC or the DCI. In another example, the value 'b' may be a positive or negative integer (e.g., the information bit is 3 bits, where the MSB indicates a positive or negative value).

In other implementations, if a HARQ process ID for CG transmission collides with a reserved HARQ process ID for HARQ-less operation, the HARQ process ID corresponding to the CG PUSCH transmission may be aborted.

Method 3: Prioritizing Either of a CG Transmission or a HARQ-Less Transmission.

Another way to resolve the HARQ process ID collision is to prioritize one of a CG transmission and a HARQ-less transmission. More specifically, when a HARQ process ID of a CG transmission collides with a reserved process ID that indicates a dynamically scheduled transmission with HARQ-less operation, a UE may determine whether to perform a HARQ state feedback operation for the CG transmission.

In some implementations, a CG transmission is prioritized over dynamic HARQ-less transmission. In one example, a HARQ process ID derived for a CG transmission is the same as the reserved HARQ process ID. The HARQ process ID is used by the CG transmission with HARQ state feedback. In one example, if the UE receives the dynamically scheduled DCI with the HARQ process ID after the transmission of the CG transmission and if a New Data Indication (NDI) field in the dynamically scheduled DCI is untoggled, a PUSCH scheduled by the dynamically scheduled DCI with the HARQ process ID is determined as an retransmission of the CG transmission. In one example, if a UE receives the dynamically scheduled DCI with the HARQ process ID after the transmission of the CG transmission and if an NDI field in the dynamically scheduled DCI is toggled, the HARQ process ID is released from the CG transmission, and a PUSCH scheduled by the dynamically scheduled DCI with the HARQ process ID is determined as a new transmission with HARQ-less operation. Thus, the UE may perform a HARQ state feedback operation for the CG transmission with the same HARQ process ID as the reserved HARQ ID.

In some implementations, dynamically scheduled HARQ-less transmission may be prioritized over CG transmission. That is, the UE does not perform a HARQ state feedback operation for the CG transmission with the same HARQ process ID as the reserved HARQ process ID. In this case, there is no retransmission for the CG transmission. The corresponding HARQ state feedback to the network may be ignored. In some implementations, the corresponding HARQ state feedback to the network may be mandated as an "ACK" state. In some implementations, irrespective of the HARQ state feedback, the network determines the HARQ state feedback as "ACK", and retransmission is not scheduled or performed.

Figure 2:
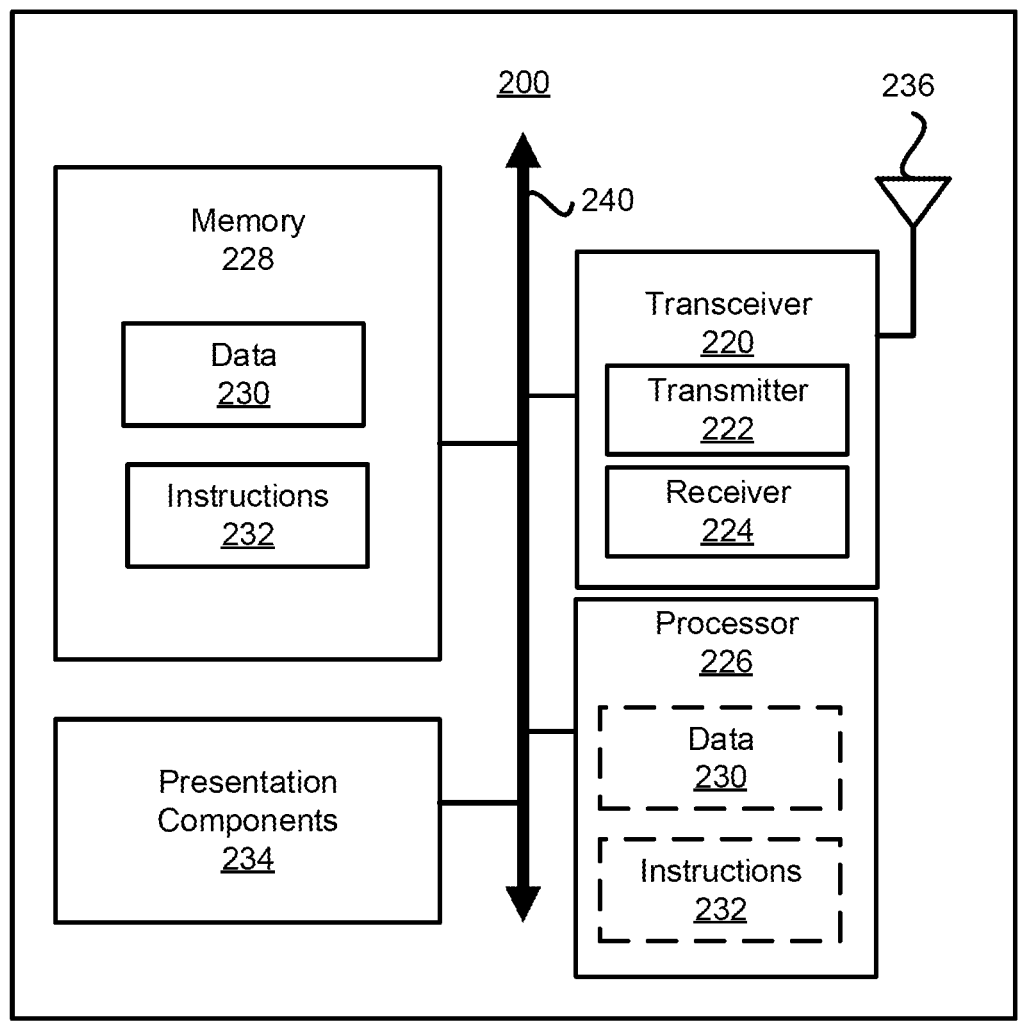
FIG. 2 is a block diagram illustrating a node for wireless communication, in accordance with example implementations of the present disclosure.

FIG. 2 illustrates a node 200 for wireless communication according to the present disclosure.

As illustrated in FIG. 2, the node 200 may include a transceiver 220, a processor 226, memory 228, one or more presentation components 234, and at least one antenna 236. The node 200 may also include a Radio Frequency (RF) spectrum band module, a BS communications module, a network communications module, and a system communications management module, input/output (I/O) ports, I/O components, and a power supply (not illustrated). Each of these components may be in communication with each other, directly or indirectly, over one or more buses 240. The node 200 may be a UE that performs various disclosed functions as illustrated in FIG. 1.

The transceiver 220 includes a transmitter 222 (with transmitting circuitry) and a receiver 224 (with receiving circuitry) and may be configured to transmit and/or receive time and/or frequency resource partitioning information. The transceiver 220 may be configured to transmit in different types of subframes and slots including, but not limited to, usable, non-usable and flexibly usable subframes and slot formats. The transceiver 220 may be configured to receive data and control channels.

The node 200 may include a variety of computer-readable media. Computer-readable media may be any media that can be accessed by the node 200 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, radio frequency (RF), infrared and other wireless media. Combinations of any of the disclosed media should be included within the scope of computer-readable media.

The memory 228 may include computer-storage media in the form of volatile and/or non-volatile memory. The memory 228 may be removable, non-removable, or a combination thereof. Memory includes solid-state memory, hard drives, and optical-disc drives. As illustrated in FIG. 2, the memory 228 may store computer-readable, computer-executable instructions 232 (e.g., software codes) that are configured to cause the processor 226 (e.g., processing circuitry) to perform various disclosed functions. Alternatively, the instructions 232 may be configured to cause the node 200 (e.g., when compiled and executed) to perform various disclosed functions.

The processor 226 may include an intelligent hardware device (e.g., a central processing unit (CPU), a microcontroller, an Application Specific Integrated Circuit (ASIC), etc.). The processor 226 may include memory. The processor 226 may process the data 230 and the instructions 232 received from the memory 228, and information received via the transceiver 220, the baseband communications module, and/or the network communications module. The processor 226 may also process information to be sent to the transceiver 220 for transmission via the antenna 236, to the network communications module for transmission to a CN.

One or more presentation components 234 present data to a person or other device. Presentation components 234 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a user equipment (UE) for performing a hybrid automatic repeat request (HARQ) feedback operation for a semi-persistent scheduling (SPS) transmission, the method comprising:
   receiving, from a network, a transmission configuration for a scheduled transmission, the transmission configuration indicating a first number of HARQ processes used for the scheduled transmission;
   receiving, from the network, an SPS transmission configuration for an SPS transmission, the SPS transmission configuration indicating a second number of HARQ processes used for the SPS transmission;
   receiving, from the network, scheduling signaling including a reserved HARQ process number for indicating that a HARQ state feedback operation for the scheduled transmission is disabled;
   determining a first HARQ process number corresponding to the SPS transmission, the first HARQ process number being selected according to the second number of HARQ processes, the first HARQ process number being equivalent to the reserved HARQ process number; and
   transmitting, to the network, a HARQ state feedback for the SPS transmission with a second HARQ process number derived according to the first HARQ process number.

2. The method of claim 1, further comprising:
   determining that the reserved HARQ process number does not overlap a first range of HARQ process numbers derived based on the second number of HARQ processes, or does not overlap a second range of HARQ process numbers derived based on the first number of HARQ processes; and transmitting, to the network, the HARQ state feedback for the SPS transmission with the first HARQ process number.

3. The method of claim 2, wherein:
the reserved HARQ process number is greater than or equal to the first range of HARQ process numbers derived based on the second number of HARQ processes,
a maximum HARQ process number from the second range of HARQ process numbers derived based on the first number of HARQ processes is greater than or equal to the first range of HARQ process numbers derived based on the second number of HARQ processes, or
the reserved HARQ process number is greater than or equal to the second range of HARQ process numbers derived based on the first number of HARQ processes.

4. The method of claim 1, wherein the scheduling signaling comprises downlink control information (DCI).

5. The method of claim 1, wherein:
the SPS transmission includes an SPS physical downlink shared channel (PDSCH) transmission or a configured grant (CG) physical uplink shared channel (PUSCH) transmission, and
the scheduled transmission includes a PDSCH transmission or a PUSCH transmission.

6. The method of claim 1, wherein the second HARQ process number is derived by shifting the first HARQ process number with an offset value.

7. The method of claim 6, wherein the offset value is configured by the network via a radio resource control (RRC) message or downlink control information (DCI).

8. The method of claim 6, wherein the second HARQ process number is obtained by imposing a modulo operation on a shifted version of the first HARQ process number.

9. The method of claim 8, wherein the modulo operation is associated with the second number of HARQ processes.

10. The method of claim 1, wherein:
the first number of HARQ processes is associated with an available range of HARQ process numbers for the scheduled transmission, and
the second number of HARQ processes is associated with an available range of the first HARQ process number for the SPS transmission.

11. A method for a user equipment (UE) for performing a hybrid automatic repeat request (HARQ) feedback operation for a semi-persistent scheduling (SPS) transmission, the method comprising:

receiving, from a network, a transmission configuration for a scheduled transmission, the transmission configuration indicating a first number of HARQ processes used for the scheduled transmission;
receiving, from the network, an SPS transmission configuration for an SPS transmission, the SPS transmission configuration indicating a second number of HARQ processes used for the SPS transmission;
receiving, from the network, scheduling signaling including a reserved HARQ process number for indicating that a HARQ state feedback operation for the scheduled transmission is disabled;
determining a first HARQ process number corresponding to the SPS transmission, the first HARQ process number being selected according to the second number of HARQ processes, the first HARQ process number being equivalent to the reserved HARQ process number; and
transmitting, to the network, a HARQ state feedback for the SPS transmission with the first HARQ process number, wherein the reserved HARQ process number indicates the HARQ state feedback until a new data indicator (NDI) corresponding to the first HARQ process number is determined to be toggled.

12. A method for a user equipment (UE) for performing a hybrid automatic repeat request (HARQ) feedback operation for a semi-persistent scheduling (SPS) transmission, the method comprising:
receiving, from a network, a transmission configuration for a scheduled transmission, the transmission configuration indicating a first number of HARQ processes used for the scheduled transmission;
receiving, from the network, an SPS transmission configuration for an SPS transmission, the SPS transmission configuration indicating a second number of HARQ processes used for the SPS transmission;
receiving, from the network, scheduling signaling including a reserved HARQ process number for indicating that a HARQ state feedback operation for the scheduled transmission is disabled;
determining a first HARQ process number corresponding to the SPS transmission, the first HARQ process number being selected according to the second number of HARQ processes, the first HARQ process number being equivalent to the reserved HARQ process number; and
disabling a HARQ state feedback operation for the SPS transmission with the first HARQ process number by not transmitting, to the network, a HARQ state feedback.

* * * * *